United States Patent [19]
Greaser et al.

[11] 3,900,340
[45] Aug. 19, 1975

[54] GALVANIC CELL STRUCTURES EMPLOYING COILED ELECTRODES

[75] Inventors: Sheridan H. Greaser, North Olmsted; Edwin T. Russell, Avon Lake, both of Ohio

[73] Assignee: Union Carbide Corporation, New York, N.Y.

[22] Filed: Nov. 13, 1973

[21] Appl. No.: 415,318

[52] U.S. Cl................. 136/13; 136/14; 136/135 R
[51] Int. Cl. ........................................ H01m 37/00
[58] Field of Search............. 136/13, 14, 28, 135 R, 136/7

[56] References Cited
UNITED STATES PATENTS
3,083,249   3/1963   Belove ................................ 136/13
3,674,565   7/1972   Bergum et al. ..................... 136/111

*Primary Examiner*—Winston A. Douglas
*Assistant Examiner*—John F. Niebling
*Attorney, Agent, or Firm*—C. F. O'Brien

[57] ABSTRACT

A galvanic cell, preferably a nickel-cadmium cell, employing a coiled electrode assembly whereby an opening is provided in the outermost layer of the separator of the assembly so that a corresponding portion of the outer face of the outermost wound electrode will be exposed for contacting the inner surface of the outer can housing said assembly with sufficient pressure to provide an electrical connection therebetween.

14 Claims, 9 Drawing Figures

PATENTED AUG 19 1975  3,900,340
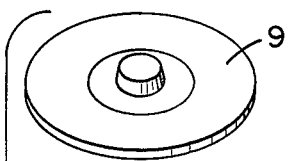
FIG. 1
PRIOR ART
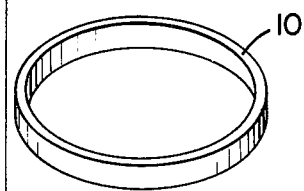
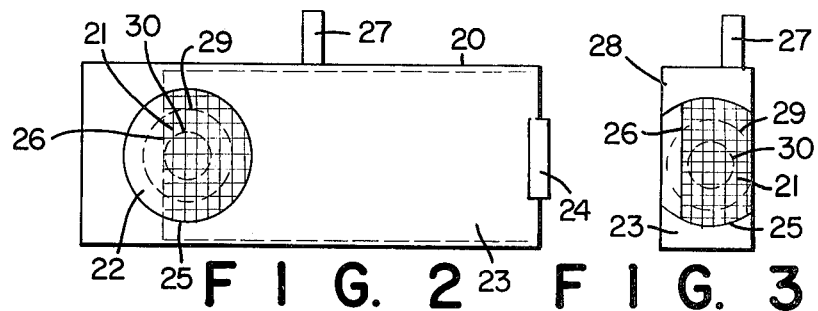
FIG. 2   FIG. 3
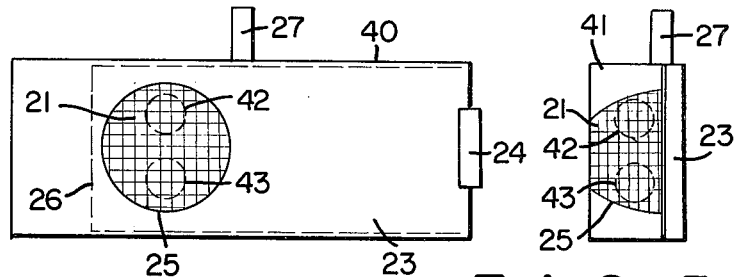
FIG. 4   FIG. 5
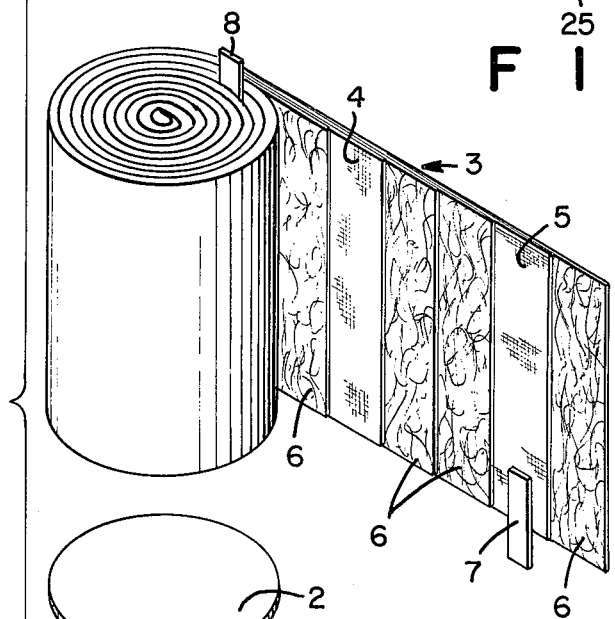
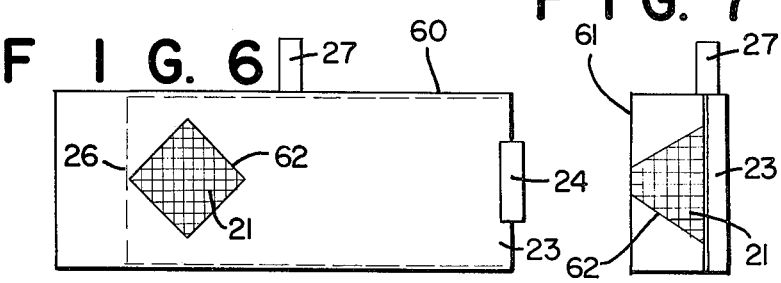
FIG. 6   FIG. 7
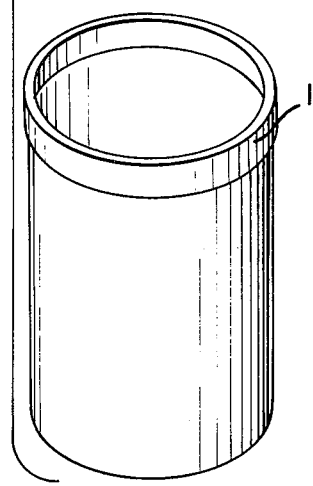
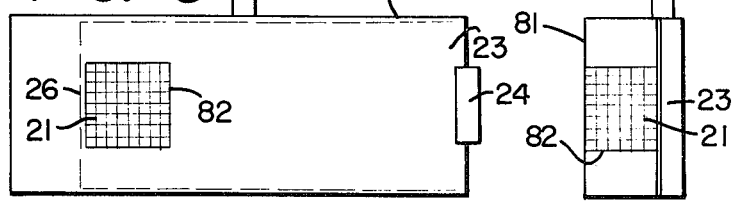
FIG. 8   FIG. 9

GALVANIC CELL STRUCTURES EMPLOYING COILED ELECTRODES

FIELD OF THE INVENTION

This invention relates to galvanic cells employing coiled electrodes, preferably nickel-cadmium cells, whereby an opening or window is provided in the outermost separator layer of the rolled electrode assembly so that a corresponding portion of the outer face of the outermost wound electrode will be exposed to contact the inner surface of the outer can housing said assembly with sufficient pressure to provide an electrical connection therebetween.

BACKGROUND OF THE INVENTION

Galvanic cells, preferably nickel-cadmium cells, employing rolled or coiled electrode assemblies (jelly roll construction) are widely known in the art. In many of these cell structures, the coiled electrode assembly is inserted into a composite housing which serves as the current conductive terminals for the cell. In such structures, the electrode of one polarity is electrically connected with a conductive housing portion, and the electrode of the opposite polarity is electrically connected with another conductive housing portion which is insulated relative to the electrically conductive first-mentioned housing portion. The electric contact between each electrode and its respective housing portion is generally formed by an elongated flexible electrically conductive connecting tab or element which is secured at one end to the electrode and at the other end is secured to the respective housing portion. When these cells are being assembled, the tabs are first welded or the like to the electrodes whereupon the tab secured to the outermost wound electrode is usually bent back upon the outermost separator layer so that when the coiled electrode assembly is inserted into the housing, the tab will contact the inner surface of the housing (can portion) with sufficient pressure to provide a satisfactory electrical connection. However, this tab has on occasion broken off when the rolled electrode assembly was inserted into the housing thereby resulting in an open circuit for the cell, or in some cases, the tab has internally short circuited the two coiled electrodes. In addition, perforation of the separator by burrs or projections in the blast and weld area of the wound electrode, has resulted in short circuit of the cell. Also, the blasting and loss of electrode material from the outermost wound electrode sheet in order to weld the conductive tab thereat, has resulted in electrochemical unbalance thus resulting in poor cell performance.

It has also been proposed that for high current applications, a plurality of tabs be secured to the outermost wound electrode along the side adjacent the closed end of a conventional container so that when such tabs are bent under and/or up along the outer separator surface, they will make pressure contact with the can bottom and/or side wall. However, the same problems recited above, are also present in this type structure.

A similar type cell construction is described in U.S. Pat. No. 3,429,747 to P. Deseniss wherein a conductive spring member is interposed between bent over bottom electrode tabs and the can bottom to effectively keep the tabs of the electrode assembly in electrical contact with cell bottom.

It is one object of the present invention to provide a tabless direct pressure contact for the outermost wound electrode of a coiled electrode assembly disposed in a conductive housing.

It is another object of the present invention to provide a substantially balanced nickel-cadmium cell having a coiled electrode assembly.

It is another object of the present invention to eliminate a major source of cell shorts in the construction of cells employing coiled electrodes.

SUMMARY OF THE INVENTION

The invention relates to a galvanic cell, particularly a nickel-cadmium cell, comprising, in combination, an electrically conductive cylindrical can closed at one end and opened at the other end; a coiled electrode assembly disposed within said can and comprising an elongated sheet of a first polarity electrode material, an elongated sheet of a second polarity electrode material and at least two separators all of which are helically wound about each other so that said at least one separator is interposed between said first polarity electrode material and said second polarity electrode material, and at least one separator is disposed about the outer circumference of the wound assembly; an electrolyte disposed in said can at least between said first and second electrodes; a conductive cover for said can; an insulating member interposed between the cover and the upper wall of the can such that a seal is formed between said can and said cover; an electrically conductive means secured to the sheet of the innermost wound electrode material and secured to the cover thereby adopting said cover as the first terminal for the cell; and at least one opening disposed in the outermost separator so as to expose a portion of the outermost wound electrode material such that said electrode material contacts the inner wall of the can thereby adopting said can as the second terminal of said cell.

As used herein, electrode material shall mean the active electrode material together with the carrier strip if one is used. As used herein a cover shall mean a substantially conductive complete closure for a can (container) or a conductive cap coupled with a separate substantially complete closure for a can.

The coiled electrode assembly can be prepared in the conventional manner whereby superimposed elongated sheets of electrode material, having at least one sheet of a larger area size separator material interposed between said electrode sheets, are first secured along at least a portion of one of their ends by using the coring technique, or the like, and then helically wound around said secured end to produce a jelly roll assembly. The outermost electrode sheet is usually longer than the inner electrode sheet of the wound assembly to insure that the ends of each electrode sheet terminates approximately in an overlapping relationship. The rolled electrode assembly is then either substantially encased within an independent outer separator layer, or the outermost electrode sheet has at least a separator sheet adjacent its outer surface so that when wound, said separator will provide the outermost layer for the rolled electrode assembly. The innermost electrode sheet can have an extended tab member welded to it as disclosed in U.S. Pat. No. 2,954,417, a conductive wire secured to it as shown in U.S. Pat. No. 3,510,353, or some similar known means for securing a conductive member to it so that said member can be extended and secured to a portion of the housing by conventional means, such as welding or the like, thereby adopting said portion of the housing, usually the cover as one terminal for the cell.

A window or opening is disposed in the outermost separator layer of the coiled electrode assembly so that a corresponding portion of the outer face of the outermost wound electrode will contact a portion of the inner surface of the electrode assembly housing; i.e., the inner wall of the can or container, with sufficient pressure to provide an electrical connection thereby adopting said portion of the cell housing as the second terminal for the cell.

The initial protrusion of the outermost electrode material through the window to contact the inner wall of the can is made possible by the fact that the coiled electrode assembly is usually very tightly wound such that the electrode material tends to bulge, as is the case when expanded metal is used as the carrier strip for the active electrode material. In addition, the compressed inner layers of separator provides a spring like action which aids in bulging the exposed electrode into contact with the can. The coiled electrodes and/or separators also swell as they absorb or take up the electrolyte. Thus it is possible to insert the coiled electrode assembly into the can without difficulty in the dry state, and then have it later swell into tighter contact when wetted with the electrolyte. One successful way of handling electrolyte addition is to use a vacuum fill method as described in U.S. Pat. No. 3,354,917 to Swanson. Another method or technique is to add a portion of the electrolyte to an empty can and then add the remainder onto the top of the coiled electrode assembly after it has been inserted. This swelling of the coiled electrode assembly will further insure contact between the exposed electrode through the window of the separator and the inner wall of the can.

It is also feasible for the window opening to extend somewhat past the end of the outermost electrode so that the end burrs of the electrode material will have an opportunity to contact the inner wall of the can since the end of said electrode is more easily bulged or bowed outward than is the face. This protruding empty segment of the separator is customarily employed to provide an extra cushion against the innermost electrode end burr shorting to the can.

The window opening can be any suitable geometric configuration such as circles, ellipses, squares, rectangles, polygons, diamonds, etc; preferably circular, and can be positioned anywhere along a vertical axis parallel to the longitudinal axis of the jelly roll, preferably about the center. The size and number of the openings can also vary depending on the particular size cell constructed. The overall size need only be sufficient to insure that sufficient contact will be had between the electrode and the inner wall of the can.

The following table will illustrate suitable areas for the window of different size cells.

| Cell Size** | Approximate Areas of Window (sq. inches) |
|---|---|
| AA (K40*) | 0.8 |
| Sub-C (K60*) | 1.0 |
| D (K90*) | 2.6 |
| N | 0.2 |

*American National Standard C18.1-1972
**Eveready Battery Applications Engineering Data (Reference Manual) - 1971 Edition Cells employing coiled electrode assemblies can be produced using various electrochemical systems such as Leclanche, nickel-cadmium, alkaline $MnO_2$, nickel-iron, nickel-zinc, and the like. This invention however, can preferably be utilized in nickel-cadmium jelly roll cells. In the uncharged condition, the innermost electrode or positive electrode of a nickel-cadmium cell is nickelous hydroxide, the outermost electrode or negative electrode is cadmium hydroxide and the electrolyte is potassium hydroxide. In the charged condition, the positive electrode is nickelic hydroxide and the negative electrode is metallic cadmium.

The negative electrode of nickel-cadmium cells can be made by the rolling technique described in U.S. Pat. Nos. 3,310,437 and 3,432,351. As described in these patents, the carrier is usually a thin nickel strip or nickel clad (or plated) steel strip, lanced and stretched to give an open grid expaned metal. With a heavy loading of active material, the metal of the carrier is visible (and contactable) on one face (the screen side) while the opposite face shows active material only (the skin side). In the practice of this invention is is preferable to orient the negative electrode in the jelly roll with the screen side out. This offers less chance of mix scrape-off on insertion, and also offers better metal to metal contact between the carrier and the inner wall of the can which is especially important on initial assembly to assure a low resistance contact. Thus in the assembled condition, the exposed portions of the carrier grid and the active electrode material will contact the inner wall of the can. The percentage contribution of each of the former to the overall contact resistance will vary with the state of charge, i.e., whether the negative active material is in the reduced form (cadmium metal) or in the oxidized form (cadmium oxide or hydroxide). It has been found that with use, that is continued charge-discharge cycling, the contact improves because the jelly roll tends to expand and exert more pressure on the contact. Furthermore, the cadmium metal that is regenerated on charge, attaches itself to the can wall and becomes more or less integrated with the negative electrode structure and the can wall.

The positive electrode may be made by the rolling technique as described in U.S. Pat. Nos. 3,310,437 and 3,432,351 or may be impregnated nickel sinter as is well known and usually has an extended conductive tab, such as a thin nickel strip, welded to the longitudinal side of the electrode strip which when inserted in the can will be protruding through the open end of the can. The extended end of this conductive tab can then be suitably secured to the cover of the cell housing by conventional techniques such as welding or the like.

The cell housing which includes at least the can and the cover may be made from materials such as nickel and nickel alloys, steel, nickel coated steel, tin coated steel, and other conductive metals and metal alloys and the like. It is evident that in some applications the can and cover can be made of different materials.

The separator for use in this invention can be of any conventional type material such as non-woven polyamide fibers (Pellon), modacrylic fibers, polypropylene fibers, fibrous-reinforced regenerated cellulose or the like.

By use of this invention, the welding of a tab to the negative electrode can be eliminated. This welding operation usually entails the removal, by air blasting, of the active electrode material about the area of the metal carrier where the tab is to be attached. This is followed by the area of attachment being coined (pressed) to reduce thickness and flatten any burrs, and then the tab is spot welded to said area. The removal of a portion of the active negative electrode material has a tendency to reduce cell quality by causing an unbalanced electrochemical system. In addition, as stated above, short circuits on assembly occur because of tearing of the tab or perforation of the separator by burrs or projections in the blast and weld area. By use of this invention, a pressure contact between the negative electrode and the inside wall of a nickel-cadmium cell is obtained by providing a window in the outer layer of encapsulating separator thereby eliminating the need for tabs or the like.

BRIEF DESCRIPTION OF THE DRAWINGS

FIG. 1 is an exploded view of a galvanic cell employing a coiled electrode assembly of the prior art.

FIGS. 2, 4, 6 and 8 are front views of flat electrode assemblies embodying the principles of this invention.

FIGS. 3, 5, 7 and 9 are front views of coiled electrode assemblies embodying the principles of this invention.

Referring in detail to FIG. 1, there is shown an exploded view of a prior art cell employing a coiled electrode assembly. The cell comprises a cylindrical can 1 into which an insulating washer 2 is inserted to insulate the bottom of can 1. A coiled electrode assembly 3 is shown with an inner wound electrode 4, usually the positive electrode, an outer wound electrode 5, usually the negative electrode, and separators 6 which separate the electrodes. A conductive tab 7 is shown welded to negative electrode 5 while a similar type conductive tab 8 is shown welded to the positive electrode 4. Conductive tab 7 is bent back upon the outermost separator 6 prior to inserting the electrode assembly 3 into the can so that when it is inserted, tab 7 will provide a pressure contact against the inner wall of the can thus adopting said can as the negative terminal. Tab 8 is welded to cover 9 of the cell thereby adopting said cover as the positive terminal of the cell. Cover gasket 10, made of any suitable insulating material such as nylon or the like, is then interposed between the cover 9 and can 1 in a conventional manner to seal said can 1 while also insulating said can 1 from cover 9. In the assembled condition, it is tab 7 that provides the contact between the negative electrode 5 and can 1. As stated above, it is the welding of this tab 7 to the negative electrode 5 and the use of tab 7 as the contact member between said electrode 5 and can 1 that has resulted in poor cell performance.

FIG. 2 shows a flat electrode assembly 20 composed of a first flat electrode member (not shown), a second flat electrode 21, a separator 22 interposed between said first electrode and second electrode 21, and an outer separator 23, all superimposed and joined at one end by a conventional slotted core 24. A circular window 25 is disposed in separator 23 thereby exposing electrode 21. The end burrs 26 of electrode 21 are also exposed through window 25 and it is these end burrs 26 that are more easily bulged or bowed outward than is the face of electrode 21 when the flat electrode assembly is helically wound about core 24. Conductive tab 27 is secured to the first flat electrode (not shown) and provides the means for connecting said electrode to a cell cover as described in conjunction with FIG. 1. FIG. 3 shows the flat electrode assembly 20 of FIG. 2 in a jelly roll construction 28. It is the exposed electrode 21 through window 25 that is intended to contact the inner wall of a can when said assembly 28 is inserted in said can. The initial protrusion of electrode 21 through window 25 to contact the inner wall of a can is made possible by the fact that the jelly roll assembly 28 is very tightly wound and by the fact that when expanded metal is used as the carrier, it is capable of bulging even though coiled. To show the variation in the size of the window that can be employed according to this invention, a smaller circular window 29, shown by broken lines, along with an even smaller circular window 30, also shown by broken lines, are illustrated in FIGS. 2 and 3. The exact size of the window need only be sufficient to insure a satisfactory electrical connection between the exposed portion of the outermost electrode and the inner wall of the can.

FIGS. 4 and 5 show a flat electrode assembly 40 and a coiled electrode assembly 41, respectively, having the same numbered elements as in FIGS. 2 and 3 except that window 35 is disposed such that it does not expose the end burrs 26 of electrode 21. As stated above, the size of window 25 can vary and it can even be replaced by two or more smaller windows 42 and 43, as shown by broken lines in FIGS. 4 and 5. Again, all that is necessary is that a sufficient portion of the electrode is exposed for providing a satisfactory electrical connection with the inner wall of the can.

FIGS. 6 and 7 show a flat electrode assembly 60 and a coiled electrode assembly 61, respectively, having the same numbered elements as is shown in FIGS. 2 and 3 except that circular window 25 is replaced with a diamond shaped window 62. Again, the size of this diamond window can vary along with the number of windows desired for a particular application.

FIGS. 8 and 9 show a flat electrode assembly 80 and a coiled electrode assembly 81, respectively, having the same numbered elements as is shown in FIGS. 2 and 3 except that circular window 25 is replaced with a square shaped window 82. The size of this window 82 can vary along with the number of such windows as dictated by the size and type cell in which the coiled electrode assembly is to be used.

EXAMPLE

Seven thousand nickel-cadmium batteries, each containing 5 AA size nickel-cadmium cells, were produced using the direct negative pressure contact of this invention. Each cell comprised, in the uncharged condition, a negative electrode of cadmium hydroxide, a positive electrode of nickelous hydroxide and an electrolyte of aqueous potassium hydroxide. The outer separator of the coiled electrode assembly of each cell was fabricated with a circular window measuring approximately 0.8 square inch. The window was disposed approximately midway on an axis parallel to the longitudinal axis of the coiled electrode assembly and positioned such that the end burrs of the negative electrode were exposed through such window as shown in FIG. 2. The coiled electrode assembly was inserted in an AA size can whereupon the exposed portion of the negative electrode contacted the inner wall of said can. The limiting of the opening to a defined window rather than exposing an entire vertical strip of the electrode, substantially eliminated any of the electrode mix from adhering to the top portion of the can when the electrode assembly was inserted into said can. The positive electrode of the cell was electrically connected to the cover of the cell as described in conjunction with FIG. 1.

All 7,000 batteries were tested for internal shorts by the loaded voltage technique and none were found defective. In the production of similar type nickel-cadmium cells using a negative tab as discussed in conjunction with FIG. 1, the rejection rate due to failure of the negative contact as evidenced by high resistance shorts at the negative tab contact area, ran as high as 4% of the total cells produced. Thus with five cells in each battery, a total rejection of 20% of the batteries is possible.

While the invention has been described in conjunction with the specific embodiments shown in the drawings, it is obvious that certain modifications may be made to the invention without deviating from the scope of the invention.

What is claimed is:

1. A galvanic cell comprising, in combination, an electrically conductive cylindrical can closed at one end and opened at the other end; a coiled electrode assembly disposed within said can and comprising an elongated sheet of the innermost wound electrode material of a first polarity electrode material, an elongated sheet of a second polarity electrode material and at least two separators all of which are helically wound about each other so that said at least one separator is interposed between said first polarity electrode material and said second polarity electrode material, and at least one separator is disposed about the outer circumference of the wound assembly; an electrolyte disposed in said can at least between said first and second electrodes; a cover for said can; an insulating member interposed between the cover and the upper wall of the can such that a seal is formed between said can and said cover; an electrically conductive means secured to the sheet of the innermost wound electrode material and secured to the cover thereby adopting said cover as the first terminal for the cell; and at least one opening disposed in the outermost separator so as to expose a portion of the outermost wound electrode material such that said exposed electrode material contacts the inner wall of the can with sufficient pressure thereby adopting said can as the second terminal of said cell.

2. The galvanic cell of claim 1 wherein the configuration of the at least one opening in said outermost separator is a circle.

3. The galvanic cell of claim 2 wherein the opening in said outermost separator is a single opening.

4. The galvanic cell of claim 1 wherein the end of the outermost electrode material is exposed through the opening in the outermost separator.

5. The galvanic cell of claim 3 wherein said opening is disposed in the outermost separator approximately about the midpoint of an axis parallel to the longitudinal axis of the coiled electrode assembly.

6. The galvanic cell of claim 1 wherein said cell is a nickel-cadmium cell, said innermost wound electrode is the positive electrode and the configuration of said at least one opening in the outermost separator is a circle.

7. The galvanic cell of claim 1 wherein said cell is an AA size cell and said opening in the outermost separator is about 0.8 square inch.

8. The galvanic cell of claim 1 wherein said cell is a Sub-C size cell and said opening in the outermost separator is about 1.0 square inch.

9. The galvanic cell of claim 1 wherein said cell is a D size cell and said opening in the outermost separator is about 2.6 square inches.

10. The galvanic cell of claim 1 wherein said cell is a N size cell and said opening in the outermost separator is about 0.2 square inch.

11. The galvanic cell of claim 1 wherein the configuration of the at least one opening in said outermost separator is an ellipse.

12. The galvanic cell of claim 1 wherein the configuration of the at least one opening in said outermost separator is a square.

13. The galvanic cell of claim 1 wherein the configuration of the at least one opening in said outermost separator is a rectangle.

14. The galvanic cell of claim 1 wherein the configuration of the at least one opening in said outermost separator is a diamond.

* * * * *